(12) United States Patent
LaPlante et al.

(10) Patent No.: US 12,510,492 B2
(45) Date of Patent: Dec. 30, 2025

(54) SYSTEM FOR MONITORING VEHICLE MANUFACTURING PROCESS EMPLOYING PORTABLE VISION SYSTEM AND QUALITY MONITORING SYSTEM

(71) Applicant: Ford Global Technologies, LLC, Dearborn, MI (US)

(72) Inventors: Walter LaPlante, Bloomfield Hills, MI (US); Harry Kekedjian, Tecumseh (CA); Chetan Patel, Sterling Heights, MI (US); Jyothi Gainadi, Northville, MI (US); Kevin Bartholomew, Belleville, MI (US); Jim Birley, Bingham Farms, MI (US); Scott Matthew King, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 461 days.

(21) Appl. No.: 18/078,392

(22) Filed: Dec. 9, 2022

(65) Prior Publication Data

US 2024/0192145 A1 Jun. 13, 2024

(51) Int. Cl.
 *G01N 21/95* (2006.01)
 *G01N 21/88* (2006.01)

(52) U.S. Cl.
 CPC ..... *G01N 21/9515* (2013.01); *G01N 21/8851* (2013.01); *G01N 2021/888* (2013.01); *G01N 2021/8887* (2013.01)

(58) Field of Classification Search
 CPC ........... G01N 21/9515; G01N 21/8851; G01N 2021/888; G01N 2021/8887

USPC ......................................................... 700/109
See application file for complete search history.

(56) References Cited

U.S. PATENT DOCUMENTS

| 5,077,674 A | * | 12/1991 | Tischler | ........... | G05B 19/41805 |
| | | | | | 29/33 P |
| 6,732,005 B1 | * | 5/2004 | Bobkin | ............ | G05B 19/41805 |
| | | | | | 29/711 |
| 2013/0150996 A1 | * | 6/2013 | Xavier | .................... | B62D 65/02 |
| | | | | | 700/109 |
| 2020/0242534 A1 | * | 7/2020 | Klink | ............... | G06Q 10/06395 |

(Continued)

FOREIGN PATENT DOCUMENTS

CN 215897828 2/2022

*Primary Examiner* — Md Azad
(74) *Attorney, Agent, or Firm* — Burris Law, PLLC

(57) ABSTRACT

A system includes a station information system, a portable vision system, and a quality monitoring system. The station information system includes a station computing device configured to provide a notification related to a manufacturing operation performed on a component. The portable vision system includes a quality check module configured to include a station task module configured to execute a quality check task based on an image. The quality monitoring system includes a quality monitoring computing device configured to request the portable vision system to execute the quality check task based on a trigger message from the station information system and to provide a task data message related to the quality check task executed by the portable vision system to the station information system. The station computing device is configured to provide the notification based on the task data message from quality monitoring system via the user interface device.

20 Claims, 5 Drawing Sheets

(56) References Cited

U.S. PATENT DOCUMENTS

| | | | |
|---|---|---|---|
| 2022/0089237 A1* | 3/2022 | Sverdlov | B25J 9/1697 |
| 2022/0136872 A1 | 5/2022 | Sohmshetty et al. | |
| 2022/0193915 A1* | 6/2022 | Marinkovich | B25J 9/1661 |
| 2022/0194502 A1* | 6/2022 | Takahashi | B62D 65/005 |
| 2022/0398707 A1* | 12/2022 | Choi | B25J 9/1679 |
| 2023/0222646 A1* | 7/2023 | Anderson | H01L 22/12 |
| | | | 382/141 |

* cited by examiner

SYSTEM FOR MONITORING VEHICLE MANUFACTURING PROCESS EMPLOYING PORTABLE VISION SYSTEM AND QUALITY MONITORING SYSTEM

FIELD

The present disclosure relates to monitoring manufacturing process of vehicles using vision system.

BACKGROUND

The statements in this section merely provide background information related to the present disclosure and may not constitute prior art.

Vehicle manufacturing processes typically employ quality checks to determine possible defects or, in other words, imperfections in components being assembled as part of the vehicle. At times, operators perform such quality checks manually, and thus, can be very subjective and prone to human error. Alternatively or in addition to manual inspections, machine vision inspections may be employed, but this may require time consuming machine learning training and can be difficult to implement in conventional systems. These and other issues related to monitoring quality of a vehicle manufacturing process are addressed by the present disclosure.

SUMMARY

This section provides a general summary of the disclosure and is not a comprehensive disclosure of its full scope or all of its features.

In one form, the present disclosure is directed to a system for monitoring a vehicle manufacturing process of a component. The system includes a station information system, a portable vision system, a quality monitoring system The station information system is disposed at a manufacturing station and includes a user interface device and a station computing device, where the station computing device is configured to provide a notification related to a manufacturing operation performed on the component at the manufacturing station using the user interface device. The portable vision system includes an imaging device operable to capture an image and a quality check module configured to include a station task module configured to execute a quality check task based on the image. The portable vision system is provided at the manufacturing station. The quality monitoring system is communicably coupled to the station information system and to the portable vision system. The quality monitoring system includes a quality monitoring computing configured to request the portable vision system to execute the quality check task based on a trigger message from the station information system and to provide a task data message related to the quality check task executed by the portable vision system to the station information system. The station computing device is configured to provide the notification based on the task data message from the quality monitoring system via the user interface device.

The following includes variations of the system for monitoring the vehicle manufacturing process of the component of the above paragraph, which may be implemented individually or in any combination.

In some variations, the station computing device is configured to obtain a component information regarding a component to be processed at the manufacturing station and transmit the trigger message to the quality monitoring system to request the portable vision system to perform the quality check task, where the trigger message includes data indicative of the component information.

In some variations, the quality check module is configured to, as the quality check task: obtain the image of the component at the manufacturing station based on the request from the quality monitoring system; identify characters in the image captured; and determine whether the characters identified in the image correspond to data indicative of the component information to determine whether the component at the manufacturing station is a correct component to be processed, where the task data message includes data indicative of whether the characters in the image match the component information.

In some variations, the quality check module is configured to, as the quality check task, determine whether the component has a defect based on the image captured and a defect detection model, where the defect detection model is a model trained employing a set of nominal images and a set of abnormal images from the imaging device.

In some variations, in response to the defect detection model detecting the defect and based on the task data message, the station computing device is configured to provide the notification to notify a user of the defect via the user interface device, to request the quality monitoring computing device to open a quality check ticket to further review the defect, or a combination thereof.

In some variations, the quality check module and the quality monitoring computing device are configured to exchange data employing a common data protocol.

In some variations, the portable vision system and the quality monitoring computing device are configured to communicate using a MQTT protocol.

In some variations, the vehicle manufacturing process includes a plurality of the manufacturing stations. Each manufacturing station includes the station information system that is communicably coupled to the quality monitoring computing device and at least one of the plurality of the manufacturing stations includes the portable vision system.

In some variations, the system further includes a plurality of the portable vision systems provided at the manufacturing operation.

In some variations, the quality monitoring computing device is configured to register and execute a software configuration of the portable vision system based on an input from a user.

In some variations, to register the portable vision system, the quality monitoring computing device is configured to store a vision system identification unique to the portable vision system, a station identification identifying the manufacturing station the portable vision system is located at, and data regarding the quality check task to be performed by the portable vision system. To execute the software configuration, the quality monitoring computing device is configured to transmit a software application associated with the quality check task to be performed by the portable vision system.

In one form, the present disclosure is directed to a system for monitoring a vehicle manufacturing process of a component. The system includes a station information system, a portable vision system, and a quality monitoring system. The station information system is disposed at a manufacturing station and includes a user interface device and a station computing device, where the station computing device is configured to provide a notification related to a manufacturing operation performed on the component at the manufacturing station using the user interface device. The portable vision system includes an imaging device operable to capture an image and a quality check module configured to include a station task module configured to execute a quality check task based on the image and where the portable vision system is provided at the manufacturing station. The quality monitoring system is communicably coupled to the station information system and to the portable vision system, and includes a quality monitoring computing device. The portable vision system and the quality monitoring system exchange message employing a common data protocol. The station computing device is configured to generate and transmit a trigger message providing data indicative of the component to the quality monitoring system. The quality monitoring system is configured to request the portable vision system to execute the quality check task after receiving the trigger message from the station information system. The portable vision system is configured to execute the quality check task after receiving the request from the quality monitoring system and to provide a task report including data regarding the quality check task to the quality monitoring system. The quality monitoring system is configured to generate and output a task data message based on the task report to the station information system. The station information system is configured to provide the notification based on the task data message from quality monitoring system via the user interface device.

In some variations, the station computing device is configured to obtain a component information regarding a component to be processed at the manufacturing station, where the trigger message includes data indicative of the component information.

In some variations, the quality check module is configured to, as the quality check task: obtain the image of the component at the manufacturing station based on the request from the quality monitoring system; identify characters in the image captured; and determine whether the characters identified in the image correspond to data indicative of the component information to determine whether the component at the manufacturing station is a correct component to be processed, where the task data message includes data indicative of whether the characters in the image match the component information.

In some variations, the quality check module is configured to, as the quality check task, determine whether the component has a defect based on the image captured and a defect detection model, where the defect detection model is a model trained employing a set of nominal images and a set of abnormal images from the imaging device.

In some variations, in response to the defect detection model detecting the defect and based on the task data message, the station computing device is configured to provide the notification to notify a user of the defect via the user interface device, to request the quality monitoring computing device to open a quality check ticket to further review the defect, or a combination thereof.

In some variations, the quality monitoring computing device is configured to register and execute a software configuration of the portable vision system based on an input from a user.

In some variations, to register the portable vision system, the quality monitoring computing device is configured to store a vision system identification unique to the portable vision system, a station identification identifying the manufacturing station the portable vision system is located at, and data regarding the quality check task to be performed by the portable vision system. To execute the software configuration, the quality monitoring computing device is configured to transmit a software application associated with the quality check task to be performed by the portable vision system.

In some variations, the vehicle manufacturing process includes a plurality of the manufacturing stations. Each manufacturing station includes the station information system that is communicably coupled to the quality monitoring computing device and at least one of the plurality of the manufacturing stations includes the portable vision system.

In some variations, the system further includes a plurality of the portable vision systems provided to perform one or more of the quality check tasks at the manufacturing operation.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
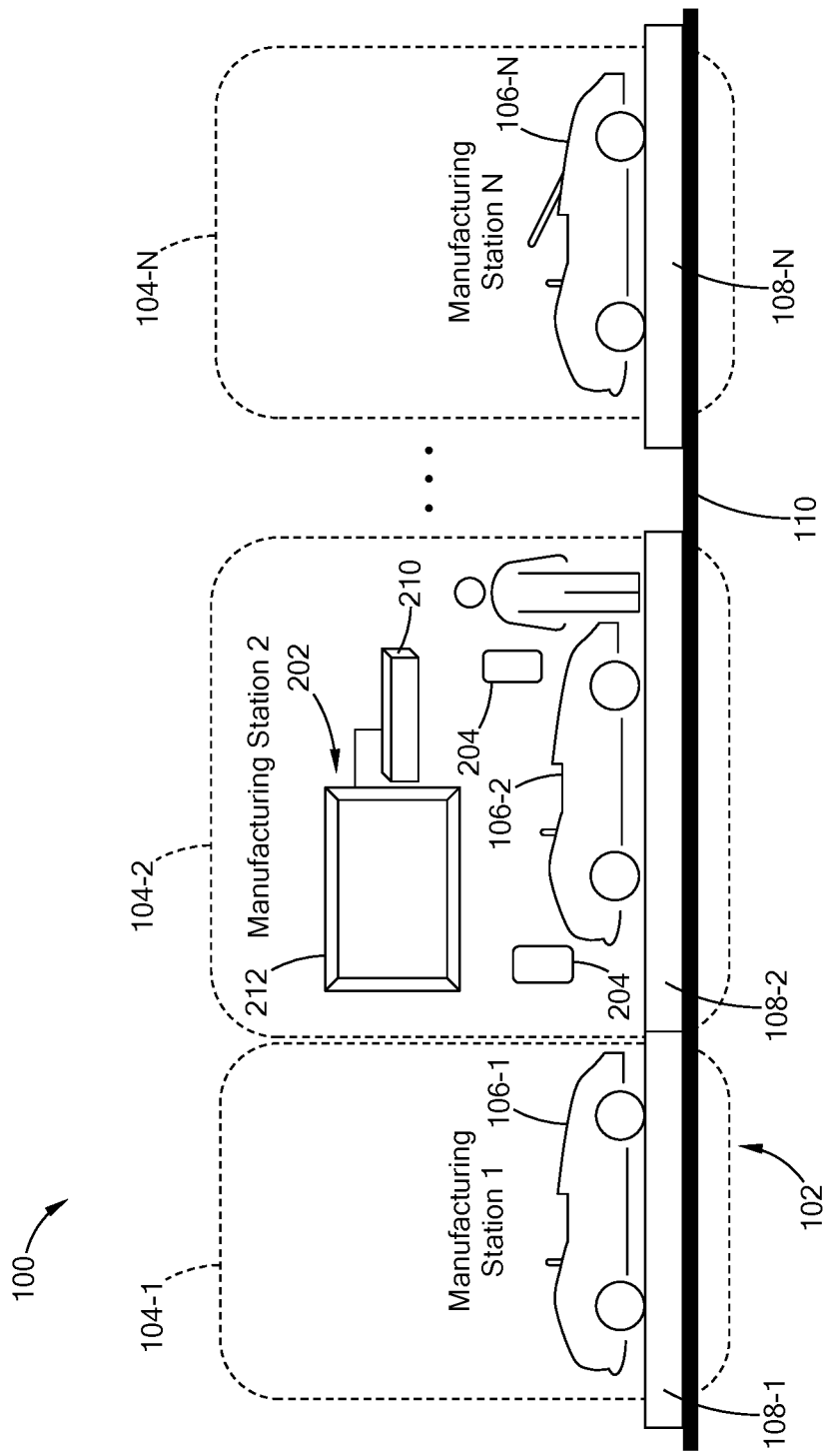
FIG. 1 illustrates a vehicle manufacturing process in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A vehicle manufacturing process within a selected facility can be designed to manufacture components to be assembled in a vehicle and even to assemble a vehicle. The vehicle manufacturing process may include multiple manufacturing operations performed at multiple manufacturing stations (e.g., a selected station can be configured to perform one or more manufacturing operations). For example, referring to FIG. 1, a vehicle manufacturing process 100 includes an assembly line 102 defined by manufacturing stations 104-1 to 104-N (collectively "station 104"), where each station 104 is configured to perform one or more allocated manufacturing operations. In the example, components, such as vehicles 106-1, 106-2, 106-N (collectively "vehicles 106") are provided on a set of platforms 108-1, 108-2, 108-N (collectively "platforms 108") that support the component and are accessible by an operator. In one form, the platforms 108 travel along the assembly line via a conveyor system 110.

The present disclosure provides a system for monitoring one or more manufacturing operations at the manufacturing facility using a quality monitoring system, a station information system provided at the station, and one or more portable vision systems configured to execute quality checks (i.e., quality check tasks). More particularly, the quality monitoring system is configured to register and track portable vision systems used in the facility, and to request a selected portable vision system to execute a quality check task based on a notification or trigger from the station information system. For example, if a component is provided at a station, the station information system triggers the quality monitoring system to have the quality check task performed. Once performed, the station information system may notify the operator at the station of any possible quality concerns regarding the component at the station. Accordingly, among other features, the system of the present disclosure may be employed to track defects/imperfection during various stages of the vehicle manufacturing process using any number of portable vision systems.

Figure 2:
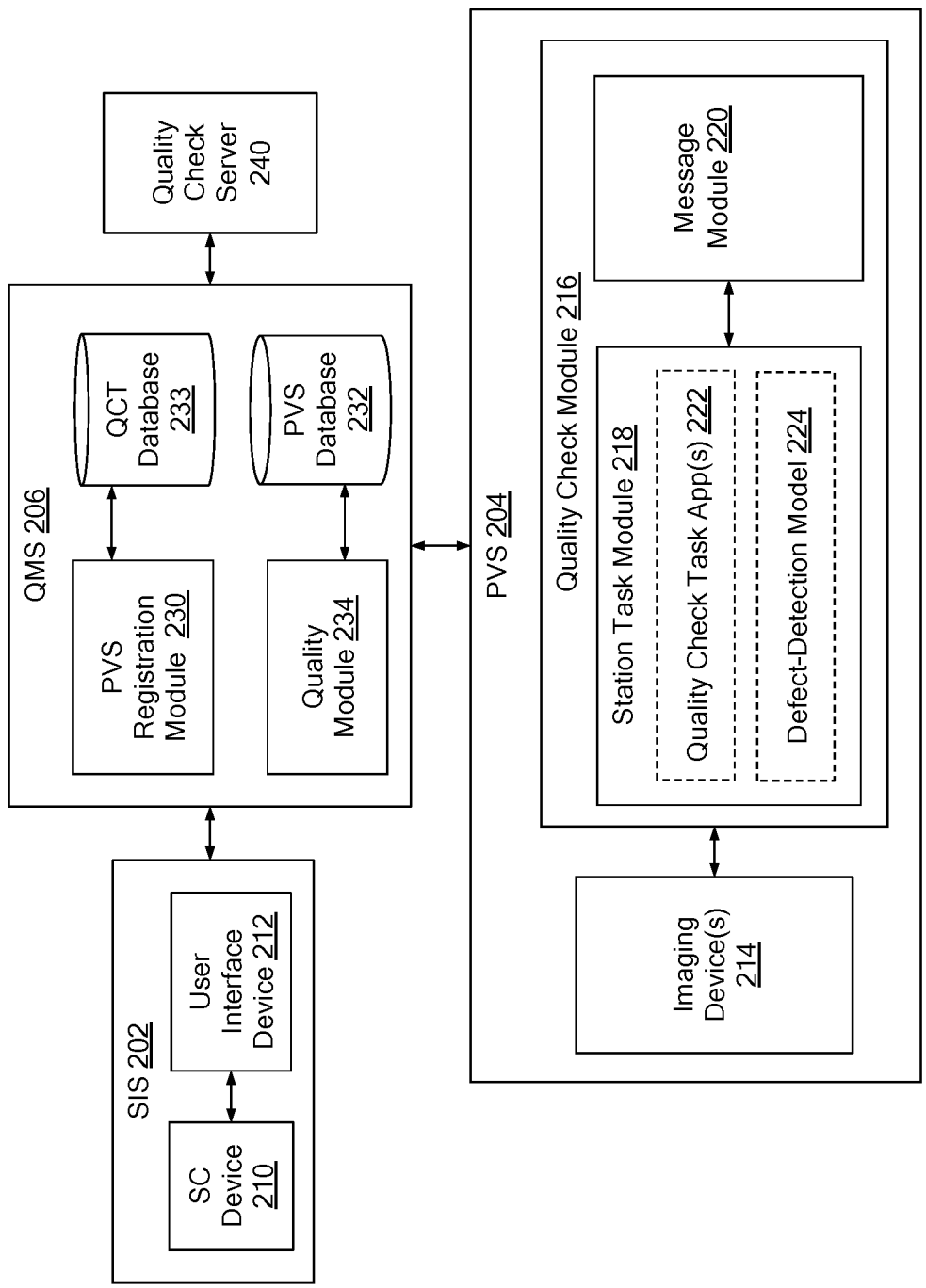
FIG. 2 is a block diagram of a system for monitoring the vehicle manufacturing process in accordance with the present disclosure.

With reference to FIG. 2, in one form, a system 200 of the present disclosure includes a station information system (SIS) 202, one or more portable vision system (PVS) 204, and a quality monitoring system (QMS) 206. In an example application, a given station 104 includes a station information system 202 and at least one portable vision system 204 (see also FIG. 1). It should be readily understood that each station of the vehicle manufacturing process may not require a station information system 202 and/or a portable vision system 204. In one form, the station information systems 202 provided in the facility are communicably coupled to the quality monitoring system 206 via a wireless and/or wired communication network. In addition, the portable vision systems 204 provided at the various stations 104 are communicable coupled to the quality monitoring system 206 via a wireless communication network such as, but not limited to, a MQTT network using MQTT protocol, TCP/IP protocol, cellular network, among others. In one form, the station information system 202 is communicably coupled to the portable vision system(s) located at the station 104 via the quality monitoring system 206.

In one form, the station information system 202, at a selected station 104 is configured to communicate information regarding the manufacturing operation and/or component to, for example, the operator. More particularly, in one form, the station information system 202 includes a station computing device 210 (SC device 210) and a user interface device 212 communicably coupled to the SC device 210 (see also FIG. 1). In one form, the user interface device 212 provides information to and may also receive an input from the operator. Accordingly, the user interface device 212 may be one or more interfaces and may include, but should not be limited to, a display, a touchscreen display, keyboard, mouse, a wearable device (e.g., smart watch, smart goggles, etc.), and/or an audio device (e.g., microphone and/or speaker).

Figure 3A:
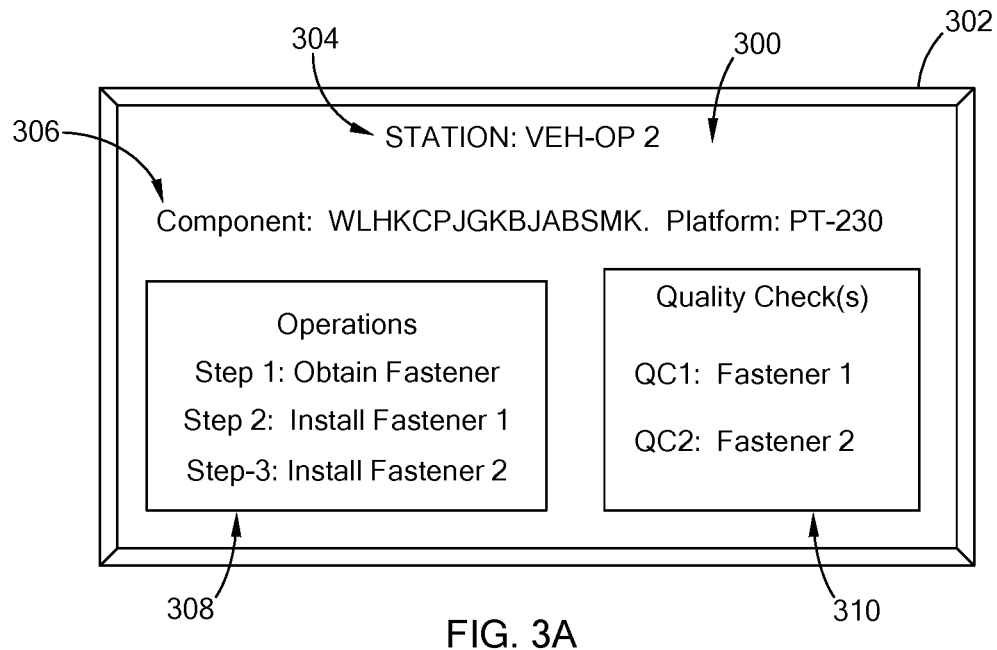
FIGS. 3A and 3B illustrate an example user interface at a manufacturing station providing information related to a manufacturing operation in accordance with the present disclosure.

In one form, the SC device 210 is configured to provide a notification related to a manufacturing operation performed on the component at the manufacturing station 104 using the user interface device 212. For example, the SC device 210 may provide: a component information related to the component at the station 104, such as a component identification number (e.g., an alpha-numerical character string), a vehicle make/type, associated with the components being processed, among other information; a fixture identification (ID) associated with the platform 108 transporting the vehicle 106; the manufacturing operation(s) to be performed at the station 104; and as described in detail below, information related to one or more quality check tasks to be performed by an associated portable vision system 204. Referring to FIG. 3A, in a non-limiting example, a notification 300 is provided on a touchscreen display 302, which is provided as the user interface 212. In the example, the notification 300 includes a station information portion 304, a component information portion 306, a manufacturing operation portion 308 providing steps for performing the manufacturing operation assigned at the station 104, and a quality check (QC) portion 310 providing information related to the quality check tasks performed by the portable vision system 204. In another example, in lieu of the touchscreen display 302, the notification may be provided on a smart watch (not shown) worn by the user.

In an example application, the station information system 202 is communicably coupled to a part tracking system (not shown) that provides information related to the component at the station 104. Specifically, the part tracking system may be provided as a server that stores information regarding each vehicle being manufactured. The information may include, but is not limited to, the component information, the fixture ID, a bill of material associated with the vehicle having the component being processed, among other information.

Figure 3B:
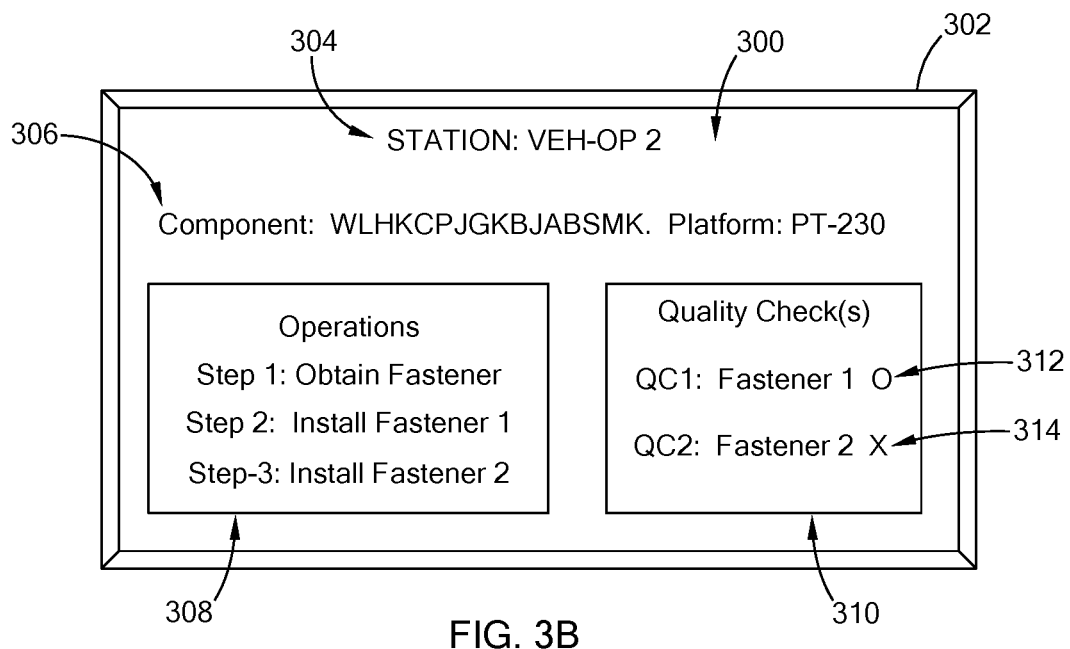

As described in detail herein, the portable vision system 204 is configured to perform one or more quality check tasks at the station 104 when the component is at the station 104. To request the tasks be performed, the SC device 210 is configured to transmit a trigger message to the quality monitoring system 206 to have the portable vision system 206 associated with the station 104 perform a quality check task. In one form, the trigger message includes data indicative of station information and component information related to the component to be processed at the manufacturing station 104. The quality monitoring system 206 may then provide a task data message that includes data related to the quality check task performed by the portable vision system 206 to the SC device 210. In some applications, the SC device 210 is configured to provide a notification, via the user interface device 212, regarding the quality check test based on the task data message. For example, FIG. 3B illustrates a circle when a quality check has a positive/nominal result (e.g., "QC1: Fastener 1") and an "X" when the quality check has a negative/defective result (e.g., "QC2: Fastener 2"). In one variation, the SC device 210 receives separate task data message for each quality check task performed, and thus, is configured to update the user interface with the appropriate notification as the messages are received.

In one form, the operator may input additional instructions related to the component via the user interface device 212 in response to the notification being defective. For example, if the notification indicates that a defect is detected on the component, the operator may request a quality check ticket be opened to further review the defect via the station information system 202. Specifically, the operator enters the instructions to open the quality check ticket for the component via the user interface device 212 and the SC device 210 outputs the instructions to the quality monitoring system 206.

In one form, the portable vision system 204 is configured to execute one or more quality check tasks including defect/imperfection checks. In some applications, the portable vision system 204 is provided as, but is not limited to, a tablet, a smart phone, and/or smart glasses. In an example application, a station 104 is provided with multiple portable vision system 204 where the portable vision systems 204 are configured to perform quality check tasks that may be different and/or same. In addition, a portable vision system 204 may be attached or secured to a fixture to routinely perform a quality check task without the need of an operator. In another example, a portable vision system 204 may be controlled by an operator. Accordingly, it should be readily understood that the portable vision system of the present disclosure may be employed in various suitable ways for executing the quality check tasks, and should not be limited to the examples provided herein.

The portable vision system 204 includes one or more imaging device(s) 214 operable to capture images and a quality check module 216. The imaging device(s) 214 may include multidimensional cameras/scanners (e.g., two-dimensional (2D) and/or three-dimensional 3D cameras and/or scanners) that capture monochrome or multichrome images. In some applications, the imaging device(s) 214 are cameras/sensors provided on the smartphone, tablet, smart glasses, etc., and do not require an isolated independent imaging device.

The quality check module 216 includes a station task module 218 configured to execute the quality check task(s) based on the image(s) and a message module 220 configured to process and generate messages based on a common data protocol. An example of such a common data protocol is provided in U.S. Pat. Pub 2022/0156704, which is commonly owned with the present application and the contents of which are incorporated herein by reference in its entirety. The publication provides for a uniform-adaptable data model for defining message schemas for various types of messages to be employed for transmitting data generated by a data originator. In one form, each of the message schemas includes a header and a message body, both having a plurality of fields. The fields are provided as key-value pairs in which the key provides information regarding the value associated with the key. Here, the message body may be configured to include data related to the quality check task performed. For example, the message body may provide the results as a simple pass or fail indicator and/or provide a more detailed evaluation (e.g., information regarding location of the defect or copy of processed images). The message body may also include a subsequent action to be performed by the quality monitoring system 206, the station information system 202, or a combination thereof. Non-limiting examples of the subsequent action include whether the quality monitoring system 206 is to provide information to the station information system 202, whether the station information system 202 is to output a notification regarding the results via the user interface, whether a quality check ticket is to be opened by the quality monitoring system 205 or the station information system 202. It should be readily understood that the messages using the common data protocol may be configured to include various type of information and should not be limited to the examples described herein.

In one form, the station task module 218 is configured to include one or more quality check task applications (App(s).) 222 to execute one or more quality check task(s) and the defect detection model 224 employed with the quality check task applications 222 for detecting defects/imperfections. The quality check task applications 222 are provided as software applications that may transmit commands to other modules/devices in the portable vision system 204, such as the imaging devices 214, when executing the quality check task(s). For example, if an image is to be acquired, the station task module 218 outputs a command directly to the imaging devices 214 to obtain the images and/or output an alert to the operator controlling the portable vison system requesting the operator to capture images. The alert may be, but is not limited to, a sound, a visual notification, and/or haptic feedback.

To execute a selected quality check task, the station task module 218 is configured to receive a request from the quality monitoring system 206 that provides information related to the quality check task to be performed and, if appropriate, supplemental data for performing the quality check task. More particularly, in one variation, the station task module 218 is configured to, as the quality check task, determine whether the component at the manufacturing station 104 is the correct component to be processed. That is, as detailed below, in response to receiving the trigger message, the quality monitoring system 206 is configured to output/transmit a request to the portable vision system 204, where the request includes information requesting a component information check and information related to the component at the station 104. The station task module 218 obtains an image of a portion of the component having the component identification, such as, but not limited to, a tag attached to the component, or a feature fixed to the component. For example, the component identification on the component may be a barcode on the opening of a vehicle door or a label on the dashboard. The station task module 218 is configured to identify characters in the image captured using known image processing techniques and determine whether the characters identified in the image correspond to data indicative of the component information provided in the request. Based on the determination by the station task module 218, the message module 220 is configured to generate and output a task report that includes data indicative of whether the characters in the image match the component information.

In another variation, the station task module 218 is configured to, as the quality check task, determine whether the component has a defect or imperfection based on the image captured and the defect detection model 224. More particularly, for a selected quality check task, the defect detection model 224 is a model defined using machine learning methodologies and may be trained on the portable vision system 204 employing a first set of images in which the component is at or within nominal features (i.e., set of nominal images) and a second set of images in which the component is outside the nominal features set abnormal (i.e., of images) and thus, defective/imperfect/abnormal. In one form, the station task module 218 may detect one or more defects, where a quality check task is associated with detecting one or more defects. For example, if the manufacturing operation at the station 104 includes assembling fasteners on the component, a quality check task is defined to determine if the fasteners were assembled within or at a nominal tolerance range. In an example application, an image of the fasteners is captured and the defect detection model 224 processes the image to identify one or more features in the image and determine if the features correlate to nominal tolerance ranges for a non-defective assembly. If the features do not correlate to the nominal tolerance ranged, then the assembly may be considered defective or imperfect. Based on the results, the message module 220 outputs the task report with the results and possible subsequent action for addressing the defect to the quality monitoring system 206. In yet another example, for detecting defects in a connector assembly, the defect detection model 224 may employ a bound box approach. An example of such an approach is provided in U.S. Pat. Pub 2022/0254055, which is commonly owned with the present application and the contents of which are incorporated herein by reference in its entirety. The publication provides that a model is used to determine the quality of a connection assembly that defines bounding boxes surrounding various components of the connector assembly. The quality of the connector assembly is based on a positional relationship between the edges of the bounding boxes.

While specific quality check task examples are provided, it should be readily understood that the quality check tasks may be defined to perform different tasks related to the component and should not be limited to the examples provided herein.

The quality monitoring system 206 is configured to manage and facilitate the portable vision system 204 and the quality check tasks being performed at the manufacturing facility. In one form, the quality monitoring system 206 includes a PVS registration module 230, a PVS database 232, a quality check task (QCT) database 233, and a quality module 234. In an example application, the quality monitoring system 206 includes one or more computing devices (i.e., a quality monitoring computing device) configured to perform the operations described herein as it relates to the quality monitoring system 206.

In one form, the PVS registration module 230 is configured to register a portable vision system 204 with a selected station 104 and to execute one or more software configurations on the portable vision system 204 based on an input from the operator. In an example application, to register a portable vision system 204, the operator may access the quality monitoring system 206 and thus, the PVS registration module 230 via, for example, a web-based interface that displays windows requesting information regarding the portable vision system 204 to be registered. In one form, based on the inputs received, the PVS registration module 230 is configured to pair with and establish a communication link with the portable vision system 204 (e.g., assign the portable vision system an IP address). In addition, the PVS registration module 230 is configured to store, in the PVS database 232, data associating the portable vision system 204 with one or more selected stations 104 and one or more quality check tasks to be performed by the portable vision system 204. In one variation, the PVS registration module 230 stores: a vision system identification unique to the portable vision system 204 (e.g., an alpha-numeric character string provided on the portable vision system); a station identification identifying the selected station 104 the portable vision system 204 is located at or to be employed at; and data regarding the quality check task(s) to be performed by the portable vision system 204.

To execute the software configuration, the PVS registration module 230 is configured to output or download the quality check task application associated with the quality check task to be performed to the portable vision system 204. More particularly, the QCT database 233 stores available quality check task applications, and based on selection from the operator, the PVS registration module 230 has selected quality check task applications provided to the portable vision system 204.

In one form, the quality module 234 is configured to have the portable vision system 204 perform a quality check based on information from the station information system 202. More particularly, the quality module 234 is configured to request the portable vision system 204 to execute the quality check task based on a trigger message from the station information system 202. For example, the quality module 234 identifies the portable vision systems 204 associated with station 104 and thus, the station information system 202 based on data in the PVS database 232 and on information in the trigger message. A single station 104 can have one or more portable vision systems 204, where each portable vision system 204 is configured to perform one or more quality check tasks. Once identified, the quality module 234 transmits one or more requests to the portable vision systems 204 associated with the station information system 202 that provided the trigger message.

The quality module 234 is further configured to process a task report related to the quality check task executed by the portable vision system 204 using the common data protocol and to output the task data message to the station information system 202 if applicable. As provided above, the station information system 202 is configured to provide a notification, via the user interface device 212, based on the task data message from the quality monitoring system 206. in one form, the station information system 202 may also have the quality monitoring system 206 store information in a quality check server 240. Specifically, if the quality check task indicates a defect, the station information system 202 is configured to request the quality monitoring system 206 and more particularly, the quality module 234, to open a quality check ticket to further review the defect with the quality check server 240. In some applications, the quality module 234 is configured to store data indicative of the task reports in a storage device or server for short-term or long-term storage.

Figure 4:
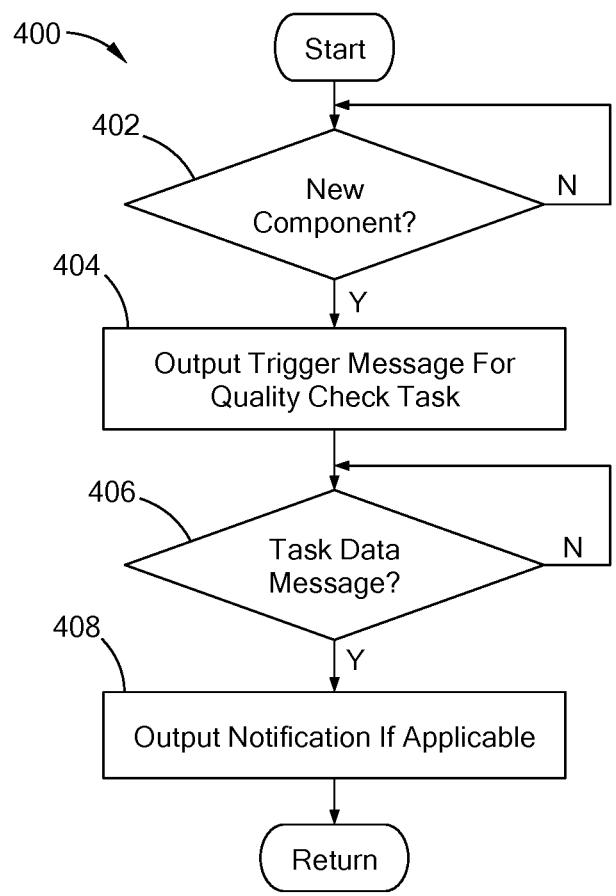
FIG. 4 is a flowchart of an example component evaluation routine in accordance with the present disclosure.

Referring to FIG. 4, an example component evaluation routine 400 performed by the station information system is provided. At 402, the station information system determines if a new component is entering the station. For example, the station information system may receive data from the part tracking system regarding a new component. If a new component is entering, the station information system outputs a trigger message to the quality monitoring system, at 404, and determines if a task data message is received at 406. If a task data message is received, the station information system is configured to output a notification if applicable, at 408. For example, if the task data message indicates that the component is the correct component, no notification may be outputted. If the task data message indicates that the component is defective/imperfect, a notification may be provided via the user interface of the station information system. It should be readily understood that the routine 400 may be configured in various suitable ways and should not be limited to the example provided herein. For example, the routine 400 may be configured to request verification/inputs from the operator at the station, such as whether the operator would like to the flag the component for additional inspection due to a defective quality check test result.

Figure 5:
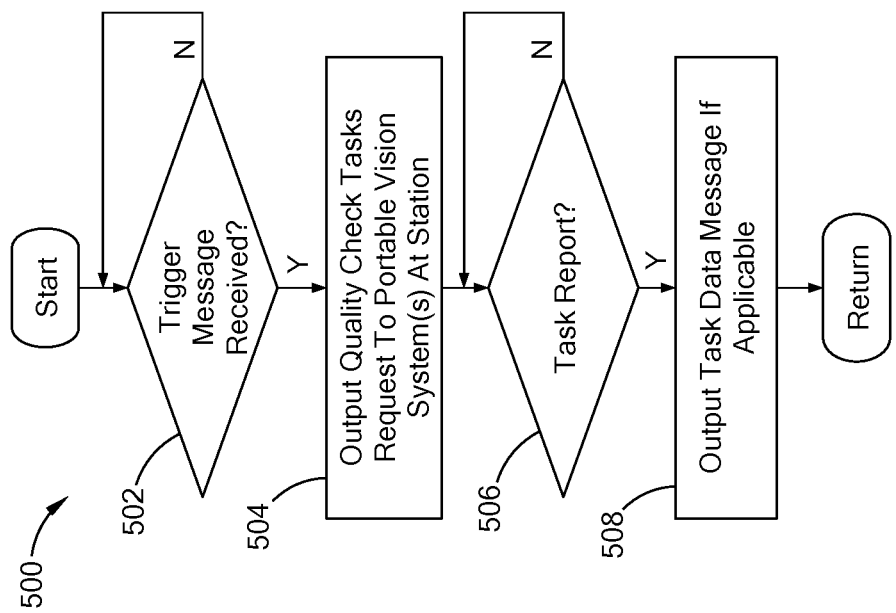
FIG. 5 is a flowchart of an example task request routine in accordance with the present disclosure.

Referring to FIG. 5, an example task request routine 500 performed by the quality monitoring system is provided. At 502, the quality monitoring system determines if a trigger message is received from a station information system. If a trigger message is received, the quality monitoring system outputs request(s) to execute one or more quality check tasks to the portable vision system(s) 204 at the station having the station information system requesting the checks, at 504. At 506, the quality monitoring system determines if task report(s) is received for the quality check tasks performed. If so, the quality monitoring system outputs task data message, if applicable, to the station information system that requested the quality check task(s). for example, if the quality check task confirms the component is the correct component, the station quality check task may indicate that the information does not have to be transmitted to the station information system. It should be readily understood that the routine 500 may be configured in various suitable way and should not be limited to the example provided herein. For example, the quality monitoring system is configured to output task data messages as it receives the task reports from the portable vision system(s).

Figure 6:
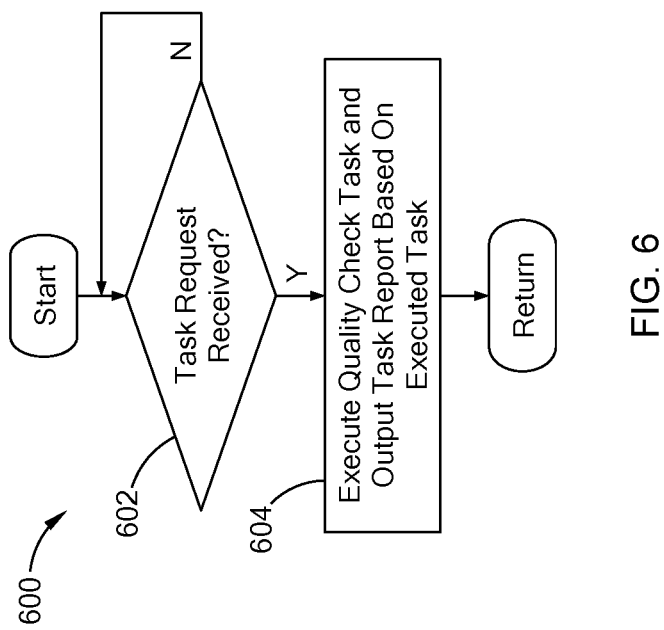
FIG. 6 a flowchart of an example quality check routine in accordance with the present disclosure.

Referring to FIG. 6, an example quality check routine 600 is provided and is executed by a portable vision system at a station. At 602, the portable vision system determine if a task request is received from the quality monitoring system. If the task request is received, the portable vision system executes the quality check task(s) and outputs the task report to the quality monitoring system based on the results of the execute quality check task, at 604. Each quality check task executed may output its own task report. It should be readily understood that the routine 600 may be configured in various suitable way and should not be limited to the example provided herein. For example, if the portable vision system is configured to execute a first set of quality check tasks for a first station and a second set of quality check tasks for a second station, the routine 600 may first determine which station it is located at based on the station information in the task request, and then execute the associated quality check tasks.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "computing device", "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for monitoring a vehicle manufacturing process of a component, the system comprising:
    a station information system disposed at a manufacturing station and including a user interface device and a station computing device, wherein the station computing device is configured to provide a notification related to a manufacturing operation performed on the component at the manufacturing station using the user interface device;
    a portable vision system including an imaging device operable to capture an image of the component and a quality check module including a station task module configured to execute a quality check task based on the image and, as the quality check task, determine whether the component has a defect or imperfection based on the captured image and a machine learning defect detection model trained on the portable vision system by employing a set of nominal images of the component and a set of abnormal images of the component from the imaging device, wherein the portable vision system is provided at the manufacturing station; and
    a quality monitoring system communicably coupled to the station information system and to the portable vision system, the quality monitoring system including a quality monitoring computing device, wherein:
    the quality monitoring computing device is configured to request the portable vision system to execute the quality check task based on a trigger message from the station information system and to provide a task data message related to the quality check task executed by the portable vision system to the station information system, wherein the trigger message includes data identifying the portable vision system associated with the station information system, and
    the station computing device is configured to provide the notification based on the task data message from the quality monitoring system via the user interface device.

2. The system of claim 1, wherein:
    the station computing device is configured to:
        obtain a component information regarding a component to be processed at the manufacturing station, and
        transmit the trigger message to the quality monitoring system to request the portable vision system to perform the quality check task, wherein the trigger message includes data indicative of the component information.

3. The system of claim 2, wherein, the quality check module is configured to, as the quality check task:

obtain the image of the component at the manufacturing station based on the request from the quality monitoring system, identify characters in the image captured, and determine whether the characters identified in the image correspond to data indicative of the component information to determine whether the component at the manufacturing station is a correct component to be processed, wherein the task data message includes data indicative of whether the characters in the image match the component information.

4. The system of claim 1, wherein in response to the machine learning defect detection model detecting the defect and based on the task data message, the station computing device is configured to provide the notification to notify a user of the defect via the user interface device, to request the quality monitoring computing device to open a quality check ticket to further review the defect, or a combination thereof.

5. The system of claim 1, wherein the quality check module and the quality monitoring computing device are configured to exchange data employing a common data protocol.

6. The system of claim 1 wherein the portable vision system and the quality monitoring computing device are configured to communicate using a MQTT protocol.

7. The system of claim 1, wherein:

the vehicle manufacturing process includes a plurality of the manufacturing stations, each manufacturing station includes the station information system that is communicably coupled to the quality monitoring computing device; and at least one of the plurality of the manufacturing stations includes the portable vision system.

8. The system of claim 1 further comprising a plurality of the portable vision systems provided at the manufacturing operation.

9. The system of claim 1, wherein the quality monitoring computing device is configured to register and execute a software configuration of the portable vision system based on an input from a user.

10. The system of claim 9, wherein:

to register the portable vision system, the quality monitoring computing device is configured to store a vision system identification unique to the portable vision system, a station identification identifying the manufacturing station the portable vision system is located at, and data regarding the quality check task to be performed by the portable vision system, and to execute the software configuration, the quality monitoring computing device is configured to transmit a software application associated with the quality check task to be performed by the portable vision system.

11. A system for monitoring a vehicle manufacturing process of a component, the system comprising:

a station information system disposed at a manufacturing station and including a user interface device and a station computing device, wherein the station computing device is configured to provide a notification related to a manufacturing operation performed on the component at the manufacturing station using the user interface device;

a portable vision system including an imaging device operable to capture an image of the component and a quality check module including a station task module configured to execute a quality check task based on the image and, as the quality check task, determine whether the component has a defect or imperfection based on the captured image and a machine learning defect detection model trained on the portable vision system by employing a set of nominal images of the component and a set of abnormal images of the component from the imaging device, wherein the portable vision system is provided at the manufacturing station; and a quality monitoring system communicably coupled to the station information system and to the portable vision system, the quality monitoring system including a quality monitoring computing device, wherein:

the portable vision system and the quality monitoring system exchange message employing a common data protocol, the station computing device is configured to generate and transmit a trigger message providing data indicative of the component to the quality monitoring system, wherein the trigger message includes data identifying the portable vision system associated with the station information system, the quality monitoring system is configured to request the portable vision system to execute the quality check task after receiving the trigger message from the station information system, the portable vision system is configured to execute the quality check task after receiving the request from the quality monitoring system and to provide a task report including data regarding the quality check task to the quality monitoring system, the quality monitoring system is configured to generate and output a task data message based on the task report to the station information system, and the station information system is configured to provide the notification based on the task data message from the quality monitoring system via the user interface device.

12. The system of claim 11, wherein the station computing device is configured to obtain a component information regarding a component to be processed at the manufacturing station, wherein the trigger message includes data indicative of the component information.

13. The system of claim 12, wherein, the quality check module is configured to, as the quality check task:

obtain the image of the component at the manufacturing station based on the request from the quality monitoring system, identify characters in the image captured, and determine whether the characters identified in the image correspond to data indicative of the component information to determine whether the component at the manufacturing station is a correct component to be processed, wherein the task data message includes data indicative of whether the characters in the image match the component information.

14. The system of claim 11, wherein in response to the machine learning defect detection model detecting the defect and based on the task data message, the station computing device is configured to provide the notification to notify a user of the defect via the user interface device, to request the quality monitoring computing device to open a quality check ticket to further review the defect, or a combination thereof.

15. The system of claim 11, wherein the quality monitoring computing device is configured to register and execute a software configuration of the portable vision system based on an input from a user.

16. The system of claim 15, wherein:

to register the portable vision system, the quality monitoring computing device is configured to store a vision system identification unique to the portable vision system, a station identification identifying the manufacturing station the portable vision system is located at, and data regarding the quality check task to be performed by the portable vision system, and to execute the software configuration, the quality monitoring computing device is configured to transmit a software application associated with the quality check task to be performed by the portable vision system.

17. The system of claim 11, wherein:

the vehicle manufacturing process includes a plurality of the manufacturing stations, each manufacturing station includes the station information system that is communicably coupled to the quality monitoring computing device; and at least one of the plurality of the manufacturing stations includes the portable vision system.

18. The system of claim 11 further comprising a plurality of the portable vision systems provided to perform one or more of the quality check tasks at the manufacturing operation.

19. The system of claim 1, wherein the quality check task is defined to determine whether at least one feature of the component is within or at a predetermined nominal tolerance range for a non-defective component.

20. The system of claim 1, wherein the machine learning defect detection model is configured to process the captured image to identify one or more features in the captured image and determine whether the one or more features correlate to nominal tolerance ranges for a non-defective component.

* * * * *